United States Patent [19]

Inomata et al.

[11] Patent Number: 5,310,846
[45] Date of Patent: May 10, 1994

[54] FLUORINE-CONTAINING SILICONE RUBBER COMPOSITION

[75] Inventors: Hiroshi Inomata; Hirofumi Kishita; Shinichi Sato, all of Annaka; Noriyuki Koike, Yoshii; Takashi Matsuda, Annaka, all of Japan

[73] Assignee: Shin-Etsu Chemical Co., Ltd., Tokyo, Japan

[21] Appl. No.: 36,252

[22] Filed: Mar. 24, 1993

[30] Foreign Application Priority Data

Mar. 24, 1992 [JP] Japan .................. 4-097043

[51] Int. Cl.$^5$ ................................ C08G 77/08
[52] U.S. Cl. ........................ 528/24; 528/35; 528/42; 556/434
[58] Field of Search ............ 556/434; 528/24, 35, 528/42

[56] References Cited

U.S. PATENT DOCUMENTS 4,988,758  1/1991  Fukuda et al. .

FOREIGN PATENT DOCUMENTS 0458617  11/1991  European Pat. Off. .
0527008   2/1993  European Pat. Off. .

Primary Examiner—Melvyn I. Marquis
Attorney, Agent, or Firm—Oblon, Spivak, McClelland, Maier & Neustadt

[57] ABSTRACT

A fluorine-containing silicone rubber composition comprising (A) a fluorocarbonsiloxane having the following general formula (1):

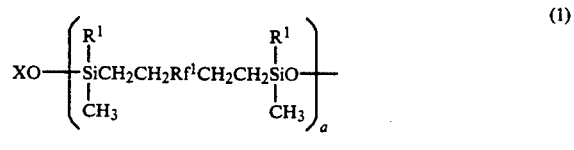

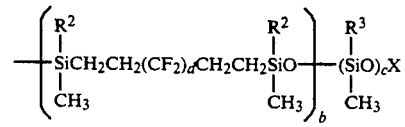

wherein a to d is a positive integer, $R^1$ and $R^2$ are a monovalent hydrocarbon group free of aliphatic unsaturated groups, $R^3$ is a monovalent hydrocarbon group containing an aliphatic unsaturated bond, $Rf^1$ is a fluorine-containing alkylene polyether group, and (B) an organic peroxide. The composition is excellent in solvent resistance, chemical resistance and water and oil repellency, and can be molded by press molding and has been improved in respect of insufficient curing.

7 Claims, No Drawings

FLUORINE-CONTAINING SILICONE RUBBER COMPOSITION

FIELD OF THE INVENTION

The present invention relates to a curable fluorine-containing silicone rubber composition excellent in solvent resistance, chemical resistance, water and oil repellency, and workability.

DESCRIPTION OF THE PRIOR ART

Curable fluorine-containing silicone rubber compositions are known to be excellent in solvent resistance, chemical resistance or like properties.

As such a fluorine-containing silicone rubber composition, for example, U.S. Pat. No. 4,057,566 discloses a composition comprising as the base component a random or alternating siloxane having the formula:

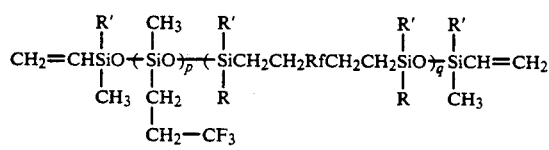

wherein R and R' are each a methyl, phenyl or 3,3,3-trifluoropropyl group, Rf is a perfluoroalkylene group having 2 to 10 carbon atoms, perfluorocycloalkylene group, or a perfluoroalkylene group or perfluorocycloalkylene group having at least one —C—O—C— linkage and 2 to 10 carbon atoms, p is a number of 0 to 2q, and q is a number of 5 on average. The composition contains as a curing agent an organohydrogenpolysiloxane having silicon-bonded hydrogen atoms, which add to vinyl groups contained in the base component mentioned above to enable the composition to form cured rubberlike elastomers.

Since the fluorine-containing silicone rubber compositions above are normally liquid, however, it is difficult to mold the compositions by press molding by means of a mold that is conventionally used for molding rubbers.

Further, the addition reaction between Si—H groups and vinyl groups for curing the above compositions are catalyzed with a platinum catalyst. The platinum catalyst may be deactivated by a trace of catalyst poisons such as amines, sulfur compounds or the like; therefore the compositions often do not cure sufficiently.

SUMMARY OF THE INVENTION

Accordingly, an object of the present invention is to provide a curable fluorine-containing silicone rubber composition that can be molded by press molding and has been improved in respect of the problem of insufficient curing.

According to the present invention, a fluorine-containing silicone rubber composition comprising:

(A) fluorocarbonsiloxane having the following general formula (1):

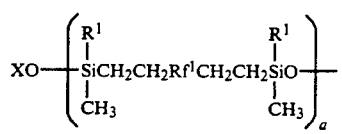

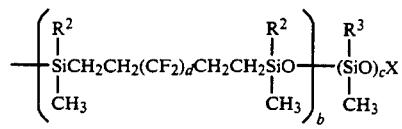

wherein
a is an integer of 2 to 300,
b is an integer of 0 to 300,
c is an integer of 0 to 5,000,
d is a integer of 2 to 8,
$R^1$ and $R^2$ are may be the same or different and each a substituted or unsubstituted monovalent hydrocarbon group free of aliphatic unsaturated groups,
$R^3$ is a substituted or unsubstituted monovalent hydrocarbon group, containing an aliphatic unsaturated bond,
$Rf^1$ is a fluorine-containing organic group having the following general formula (2):

wherein f and h are each an integer of 1 to 5, g is an integer of 0 to 8, and e and i are each an integer of 0 to 1, provided that the number of the entire carbon atoms contained ranges from 11 to 30, X is a triorganosiloxy group having the following general formula (3):

where $R^4$, $R^5$ and $R^6$ may be the same or different and each a monovalent hydrocarbon group having 1 to 8 carbon atoms, and (B) an organic peroxide.

The composition of the present invention is excellent in solvent resistance, chemical resistance and water and oil repellency; and can be molded by press molding and has been improved in respect of insufficient curing.

DETAILED DESCRIPTION OF PREFERRED EMBODIMENTS

(A) Fluorocarbonsiloxane

In the general formula (1) representing the fluorocarbonsiloxane used in the present invention, a is an integer of 2 to 300, particularly 10 to 50, b is an integer of 0 to 300, particularly 0 to 50, c is an integer of 0 to 5,000, particularly 0 to 1,000, and d is an integer of 2 to 8, particularly 2 to 6.

$R^1$ and $R^2$ are a saturated or unsaturated monovalent hydrocarbon group not containing an aliphatic unsaturated bond, which preferably has 1 to 8 carbon atoms. Examples thereof include specifically alkyl groups such as methyl, ethyl, propyl, butyl and the like, cycloalkyl groups such as cyclohexyl, aryl groups such as phenyl, tolyl and the like, aralkyl groups such as benzyl, and corresponding substituted groups of them in which a part or all of the hydrogen atoms therein have been replaced by a halogen atom, cyano group or the like, including, e.g., a chloromethyl group, 3,3,3-trifluoropropyl group and cyanoethyl group.

$R^3$ is a substituted or unsubstituted monovalent hydrocarbon group containing an aliphatic unsaturated bond, and includes for example alkenyl groups having 2 to 8 carbon atoms such as vinyl, allyl, isopropenyl and the like.

$Rf^1$ is a fluorine containing organic group represented by the general formula (2) and contains 11 to 30 carbon atoms therein. If this group contains more than 30 carbon atoms, the excellent properties such as solvent resistance, water and oil repellency, etc. of the fluorine containing silicone rubber composition will be impaired. Preferred examples of $Rf^1$ include:

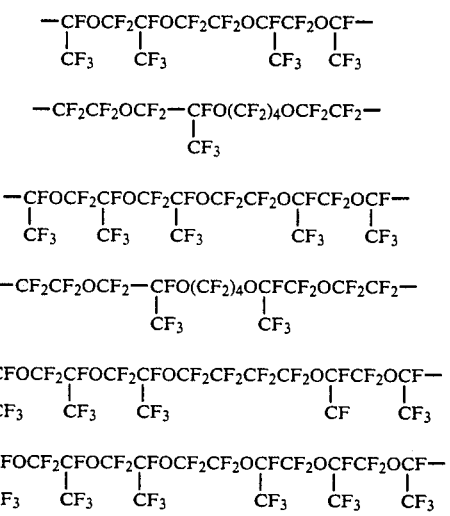

Further, in the general formula (1), X is a group represented by the general formula (3) in which $R^4$, $R^5$ and $R^6$ are each a substituted or unsubstituted monovalent hydrocarbon group having 1 to 8 carbon atoms, which groups include for example alkyl groups such as methyl, ethyl, propyl, butyl and the like; cycloalkyl groups such as cyclohexyl; alkenyl groups such as vinyl, allyl, isopropenyl and like; aryl groups such as phenyl and tolyl; aralkyl groups such as benzyl and the like; and corresponding substituted groups of them in which a part or all of the hydrogen atoms have been substituted by a halogen atom, for example, chloromethyl, 3-chloropropyl, 3,3,3-trifluoropropyl, 6,6,6,5,5,4,4,3,3-nonafluorohexyl. Where c in the general formula (1) is 0, at least one of $R^4$ to $R^6$ needs to be an alkenyl group; thus the fluorocarbonsiloxane of the general formula (1) always contains an aliphatic unsaturated bond, which makes the composition curable with an organic peroxide.

Further, where the fluorocarbonsiloxane has been prepared by copolymerization of a segment having $Rf^1$ and a segment having $-(CF_2)_d-$ (that is, b is not 0), the cured products obtained from the resulting composition have an improved strength.

Among the fluorocarbonsiloxanes represented by the general formula (1), particularly preferred in the present invention are, for example, the compounds represented by the formula (4) or (5):

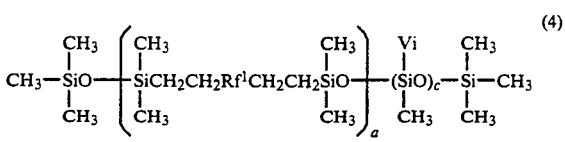

wherein Vi represents the vinyl group, and $Rf^1$, a and c are as defined above,

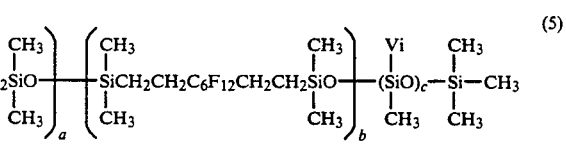

wherein Vi, $Rf^1$, a, b and c are as defined above,

The fluorocarbonsiloxane of the general formula (1) described above can be produced according to processes known per se: for example it can be obtained cohydrolysis of chlorosilane compounds corresponding to respective segments.

(B) Organic peroxide

The organic peroxide, the component (B) in the present invention, acts as a radical initiator in crosslinking, and therefore it is not attended by a problem of reduction of its activity due to catalyst poison. This is a great advantage of the present invention.

As the organic peroxide, any of those which have been used as a radical initiator of this type can be used. The organic peroxide includes, for example, benzoyl peroxide, di-t-butyl peroxide, dicumyl peroxide, 2,5-dimethyl-2,5-di(t-butylperoxy)hexane, decanoyl peroxide, t-butylcumyl peroxide, α,α'-bis(t-butylperoxy-m-isopropyl)benzene, and 2,5-dimethyl-2,5-di(t-butylperoxy)hexene-3. The organic peroxides may be used singly or in combination of two or more.

The organic peroxide is used in an amount of 0.1 to 10 parts by weight, preferably 0.2 to 5 parts by weight, per 100 parts by weight of the fluorocarbonsiloxane, the component (A). The amount of the organic peroxide is less than 0.1 parts by weight, the cured products obtained are low in crosslink density and therefore poor in mechanical properties. If the amount is more than 10 parts by weight, foaming may occur on curing to produce cured products that are unsatisfactory in properties such as heat resistance, permanent compression set, etc.

Other Components

The composition of the present invention essentially contains the components (A) and (B) described above, and may optionally contain a variety of additives for rubbers. For example, a filler can be added for the purpose of reduction of heat shrinkage that may occur on curing, reduction in thermal expansion coefficient of the cured products, improvement in thermal stability, weathering properties, chemical resistance, fire retardance, mechanical strength, etc., and reduction in a gas permeability. Such a filler includes, for example, fumed silica, quartz powders, glass fibers, carbon, metal oxides such as iron oxide, titanium oxide, cerium oxide and the like, metal carbonates such as calcium carbonate and magnesium carbonate. Besides fillers, pigments, dyes, antioxidants, etc. may be added.

Fluorine-Containing Silicone Rubber Composition

The fluorine-containing silicone rubber composition of the present invention can be prepared easily by blending necessary components described above uniformly.

The composition thus obtained can be worked by press molding by means of molds which have been conventionally used for shaping rubbers to produce a molded cured product.

EXAMPLES

In the examples below, viscosity was measured at 25° C.

EXAMPLE 1

With two rolls are mixed 100 g of a fluorocarbonsiloxane having the formula:

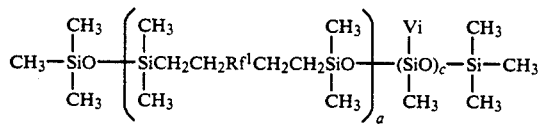

wherein $Rf^1$ is the fluorine-containing organic group represented by the general formula (2) in which e, g and i are 0, f is 2, and h is 3, and having a viscosity of 250,000 cSt and a vinyl content of 0.008 mol/100 g, 23 g of a fumed silica, 1.0 g of cerium oxide, and 2.5 g of magnesium carbonate. Subsequently, to the mixture obtained, 1.5 g of 2,5-dimethyl-2,5-di(t-butylperoxy)hexane was added, followed by mixing uniformly to prepare a composition (Composition I).

Composition I was pressed under the conditions of 170° C. and 120 kg/cm² for 10 minutes to produce a sheet with a thickness of 2 mm, which was then heated at 200° C. in an oven for 4 hours.

The sheet thus obtained was measured for rubber properties in accordance with JIS K 6301. The results obtained are given in Table 1. Hardness was measured using A-type spring hardness tester according to JIS K 6301.

TABLE 1

| Composition I | |
|---|---|
| Hardness | 50 |
| Elongation (%) | 560 |
| Tensile strength (kgf/cm²) | 39 |

EXAMPLE 2

Example 1 was repeated except that the fluorocarbonsiloxane was replaced by a fluorocarbonsiloxane represented by the formula:

wherein $Rf^1$ is a fluorine-containing organic group represented by the general formula (2) in which e, g and i are 0, f is 2, and h is 3, and having a viscosity of 950,000 cSt and a vinyl content of 0.008 mol/100 g. The prepared and tested composition is referred to as Composition II. The results are given in Table 2.

TABLE 2

| Composition II | |
|---|---|
| Hardness | 54 |
| Elongation (%) | 650 |
| Tensile strength (kgf/cm²) | 53 |

EXAMPLE 3

The rubber sheets with a thickness of 2 mm obtained from Compositions I and II in Examples 1 and 2, respectively, were tested for solvent resistance, chemical resistance and surface characteristics. The results are given in Table 3 and 5. For comparison, sheets were prepared from a dimethylsilicone rubber and a fluorine rubber (vinylidene fluoride/hexafluoropropylene fluorine rubber) in the same manner and tested for solvent resistance and chemical resistance. The results are given in Table 3 and Table 4.

The test methods are as described below.

Test for solvent resistance

A rubber sheet was immersed in a solvent shown in Table 3 at 25° C. for 3 days. The volume change that occurred was measured to evaluate the solvent resistance.

Test for chemical resistance

A rubber sheet was immersed in an aqueous solution of an acid or an alkali shown in Table 4 at 25° C. for 7 days. The volume change that occurred was measured to evaluate the chemical resistance.

The test for surface characteristics

The contact angle of a rubber sheet with respect to a pure water or a lubricating oil (oil of ASTM No. 3) was measured to evaluate the surface characteristics.

TABLE 3

| Solvent | Composition I | Composition II | Dimethyl silicone rubber | Fluorine rubber |
|---|---|---|---|---|
| Toluene | 18 | 19 | 120 | 10 |
| n-Heptane | 15 | 15 | 160 | 1 |
| MIK* | 34 | 35 | 80 | 209 |

*MIK: methyl isobutyl ketone

TABLE 4

| 10% aqueous solution of: | Composition I | Composition II | Dimethyl silicone rubber | Fluorine rubber |
|---|---|---|---|---|
| NaOH | 0 | 0 | 0 | 0 |
| HCl | 0 | 0 | 2 | 0 |
| HNO₃ | 0 | 0 | 8 | 0 |
| H₂SO₄ | 0 | 0 | 5 | 0 |

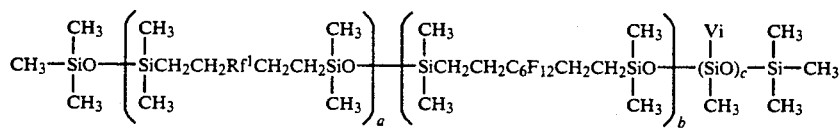

| Surface characteristics (contact angle, degree) | | |
|---|---|---|
| | Composition I | Composition II |
| Pure water | 110 | 105 |
| Lubricating oil | 53 | 51 |

We claim:
1. A fluorine-containing silicone rubber composition comprising:
(A) fluorocarbonsiloxane having the following general formula (1):

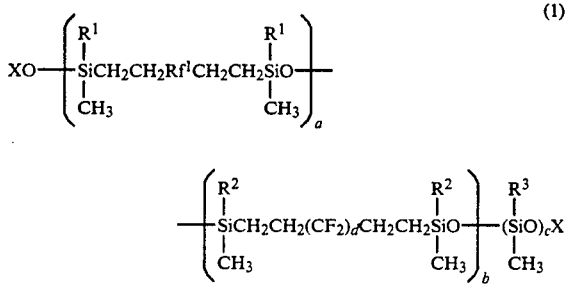

wherein
a is an integer of 2 to 300,
b is an integer of 0 to 300,
c is an integer of 0 to 5,000,
d is a integer of 2 to 8,
$R^1$ and $R^2$ are may be the same or different and each a substituted or unsubstituted monovalent hydrocarbon group free of aliphatic unsaturated groups,
$R^3$ is a substituted or unsubstituted monovalent hydrocarbon group containing an aliphatic unsaturated bond,
$Rf^1$ is a fluorine-containing organic group having the following general formula (2):

wherein f and h are each an integer of 1 to 5, g is an integer of 0 to 8, and e and i are each an integer of 0 to 1, provided that the number of the entire carbon atoms contained ranges from 11 to 30,
X is a triorganosiloxy group having the following general formula (3):

$$-\underset{\underset{R^5}{|}}{\overset{\overset{R^4}{|}}{Si}}-R^6 \qquad (3)$$

where $R^4$, $R^5$ and $R^6$ may be the same or different and each a monovalent hydrocarbon group having 1 to 8 carbon atoms, and
(B) an organic peroxide.

2. The composition according to claim 1, wherein in the general formula (1) $R^1$ and $R^2$ are a monovalent hydrocarbon group having 1 to 8 carbon atoms, $R^3$ is an alkenyl group having 2 to 8 carbon atoms, and $R^4$ to $R^6$ are a monovalent hydrocarbon group having 1 to 8 carbon atoms.

3. The composition according to claim 1, wherein in the general formula (1) c is 0, and a t least one of $R^4$, $R^5$ and $R^6$ is an alkenyl group.

4. The composition according to claim 1, wherein in the formula (1) $Rf^1$ is a group selected from the group consisting of:

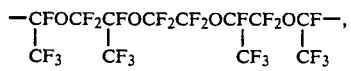

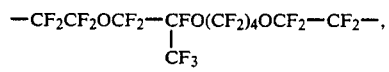

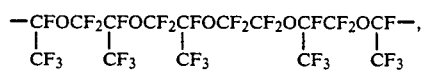

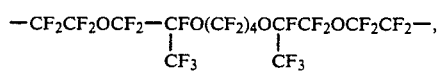

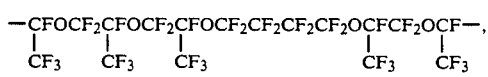

and

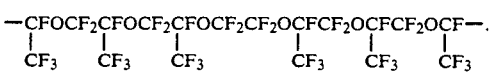

5. The composition according to claim 1, wherein the fluorocarbonsiloxane of the component (A) is represented by the general formula (4) or (5):

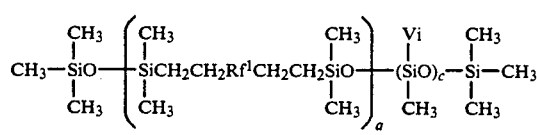

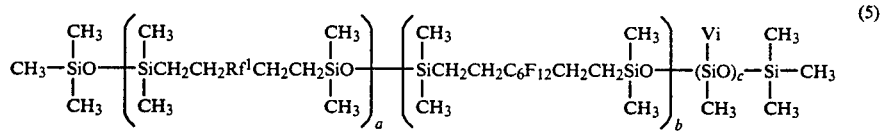

6. The composition according to claim 1, wherein the organic peroxide of the component (B) is present in an amount of 0.1 to 10 parts by weight per 100 parts by weight of the component (A).

7. A cured product obtained by curing a composition as claimed in claim 1.

* * * * *